US011842646B2

(12) United States Patent
Urbanec et al.

(10) Patent No.: US 11,842,646 B2
(45) Date of Patent: Dec. 12, 2023

(54) SYSTEM AND METHOD FOR PROVIDING INTERACTIVE ELECTRONIC CHARTS

(71) Applicant: HONEYWELL INTERNATIONAL INC., Charlotte, NC (US)

(72) Inventors: Jan Urbanec, Stara Lubovna (SK); Santosh Sahoo, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 47 days.

(21) Appl. No.: 17/214,145

(22) Filed: Mar. 26, 2021

(65) Prior Publication Data

US 2022/0254257 A1 Aug. 11, 2022

(30) Foreign Application Priority Data

Feb. 10, 2021 (IN) ............................ 202111005661

(51) Int. Cl.

*G06F 3/048* (2013.01)
*G08G 5/00* (2006.01)
*G06F 3/0482* (2013.01)
*B64D 43/00* (2006.01)

(52) U.S. Cl.

CPC ............ *G08G 5/003* (2013.01); *B64D 43/00* (2013.01); *G06F 3/0482* (2013.01); *G08G 5/0013* (2013.01)

(58) Field of Classification Search

CPC ...... G08G 5/003; G08G 5/0013; B64D 43/00; G06F 3/0482

See application file for complete search history.

(56) References Cited

U.S. PATENT DOCUMENTS

| | | | |
|---|---|---|---|
| 6,832,152 B1 | 12/2004 | Bull et al. | |
| 7,876,238 B2 | 1/2011 | Vandenbergh et al. | |
| 8,843,255 B2 | 9/2014 | Wilson et al. | |
| 9,858,823 B1 | 1/2018 | Lynn et al. | |
| 9,979,758 B2 | 5/2018 | Duncker et al. | |
| 10,162,504 B2 | 12/2018 | Kennedy | |
| 10,339,817 B1 | 7/2019 | McGaughy et al. | |
| 10,473,484 B1 * | 11/2019 | Goldstein | G08G 5/0052 |

(Continued)

FOREIGN PATENT DOCUMENTS

| | | | |
|---|---|---|---|
| EP | 2199747 A2 | 6/2010 | |
| WO | WO-2011036499 A1 * | 3/2011 | G06F 17/2247 |

*Primary Examiner* — Aleksey Olshannikov
(74) *Attorney, Agent, or Firm* — Lorenz & Kopf LLP

(57) ABSTRACT

A method for transferring electronic chart data during aerial vehicle operations to an avionics system is disclosed. The method includes: receiving an electronic chart file for an electronic chart; identifying a plurality of data elements in the electronic chart that contain information content for flight crew entry into avionics systems; translating each identified data element into a control element having one or more values that an avionics system will understand; associating at least one control element with an avionics system; displaying the electronic chart with the control elements; displaying a data entry graphical element, responsive to user selection of the at least one control element; and transferring avionics information from the selected control element to an avionics system associated with the control element responsive to selection of at least one selectable graphical element to change a state of an avionics system associated with at least one control element.

18 Claims, 4 Drawing Sheets

200
202
RNAV (GPS) RWY 7R
202
202
202
RNAV (GPS) RWY 7R

(56) References Cited

U.S. PATENT DOCUMENTS

| | | | | |
|---|---|---|---|---|
| 10,584,979 | B1 | 3/2020 | Gunn et al. | |
| 2007/0260992 | A1 | 11/2007 | Hajdukiewicz | |
| 2011/0087388 | A1 | 4/2011 | Watson et al. | |
| 2017/0178629 | A1 | 6/2017 | Alves et al. | |
| 2022/0215764 | A1* | 7/2022 | Tuccio ................. | G08G 5/0091 |

* cited by examiner

SYSTEM AND METHOD FOR PROVIDING INTERACTIVE ELECTRONIC CHARTS

CROSS REFERENCE TO RELATED APPLICATION

This application claims priority to Indian Provisional Patent Application No. 202111005661, filed Feb. 10, 2021, the entire content of which is incorporated by reference herein.

TECHNICAL FIELD

The technology described in this patent document relates generally to display systems in an aircraft and more particularly to systems and methods for providing interactive electronic charts that facilitate semi-automatic setting and configuration of avionics systems.

BACKGROUND

In modern cockpits, some avionics systems may have the ability to display electronic charts on one or multiple multi-function displays. The ability to display electronic charts with avionics systems can eliminate the need for paper charts or separate, standalone hardware to display charts in aircraft. The display of electronic charts using avionics systems can also allow for an aircraft symbol to be visually depicted on the charts, which can increase situational awareness and help with pilot orientation regarding his environment whether airborne or on ground.

The displayed charts can include several data elements that a pilot may need to input to avionics systems during flight or on the ground. The pilot typically needs to memorize and manually enter relevant data items from the charts to the avionics systems at the appropriate time. Because relevant data items are manually entered, there is a potential for human error during the data item entry.

Accordingly, it is desirable to provide systems and methods for reducing the likelihood of human error during the entry of data items from charts to avionics systems. Furthermore, other desirable features and characteristics of the present invention will become apparent from the subsequent detailed description of the invention and the appended claims, taken in conjunction with the accompanying drawings and the background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A processor-implemented method in an aerial vehicle for transferring electronic chart data during aerial vehicle operations to an avionics system is disclosed. The method includes: receiving an electronic chart file for an electronic chart; identifying a plurality of data elements in the electronic chart that contain information content for flight crew entry into avionics systems on the aerial vehicle; translating each identified data element into a control element having one or more values or flight plan data that an avionics system will understand; associating at least one control element with an avionics system into which the one or more values or flight plan data of the control element may be entered whereby the electronic chart is converted to an interactive electronic chart; displaying, on a display device, the interactive electronic chart which includes the control elements; displaying a data entry graphical element, responsive to user selection of the at least one control element, the displayed data entry graphical element including avionics information from the selected control element and one or more selectable graphical elements identifying an avionics system function for the avionics information; and transferring avionics information from the selected control element to an avionics system associated with the control element responsive to the selection of at least one selectable graphical element to change a state of an avionics system associated with at least one control element; wherein the plurality of data elements in the electronic chart that contain information content for flight crew entry into avionics systems on the aerial vehicle are made interactive.

A system in an aerial vehicle for transferring electronic chart data during aerial vehicle operations to an avionics system is disclosed. The system includes a controller configured to: receive an electronic chart file for an electronic chart; identify a plurality of data elements in the electronic chart that contain information content for flight crew entry into avionics systems on the aerial vehicle; translate each identified data element into a control element having one or more values or flight plan data that an avionics system will understand; associate at least one control element with an avionics system into which the one or more values or flight plan data of the control element may be entered whereby the electronic chart is converted to an interactive electronic chart; cause the interactive electronic chart which includes the control elements to be displayed on a display device; cause a data entry graphical element to be displayed responsive to user selection of the at least one control element, wherein the displayed data entry graphical element includes avionics information from the selected control element and one or more selectable graphical elements identifying an avionics system function for the avionics information; and transferring avionics information from the selected control element to an avionics system associated with the control element responsive to the selection of at least one selectable graphical element to change a state of an avionics system associated with at least one control element; wherein the plurality of data elements in the electronic chart that contain information content for flight crew entry into avionics systems on the aerial vehicle are made interactive.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

The subject matter described herein discloses apparatus, systems, techniques and articles for providing automation between electronic charts and data entry into avionics system which can provide further automation in the cockpit, ease pilot workload, minimize human error during manual data re-entry and provide a very intuitive interface to setup avionics while cross-checking electronic charts. The following detailed description is merely exemplary in nature and is not intended to limit the invention or the application and uses of the invention. As used herein, the word "exemplary" means "serving as an example, instance, or illustration." Thus, any embodiment described herein as "exemplary" or "example" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1:
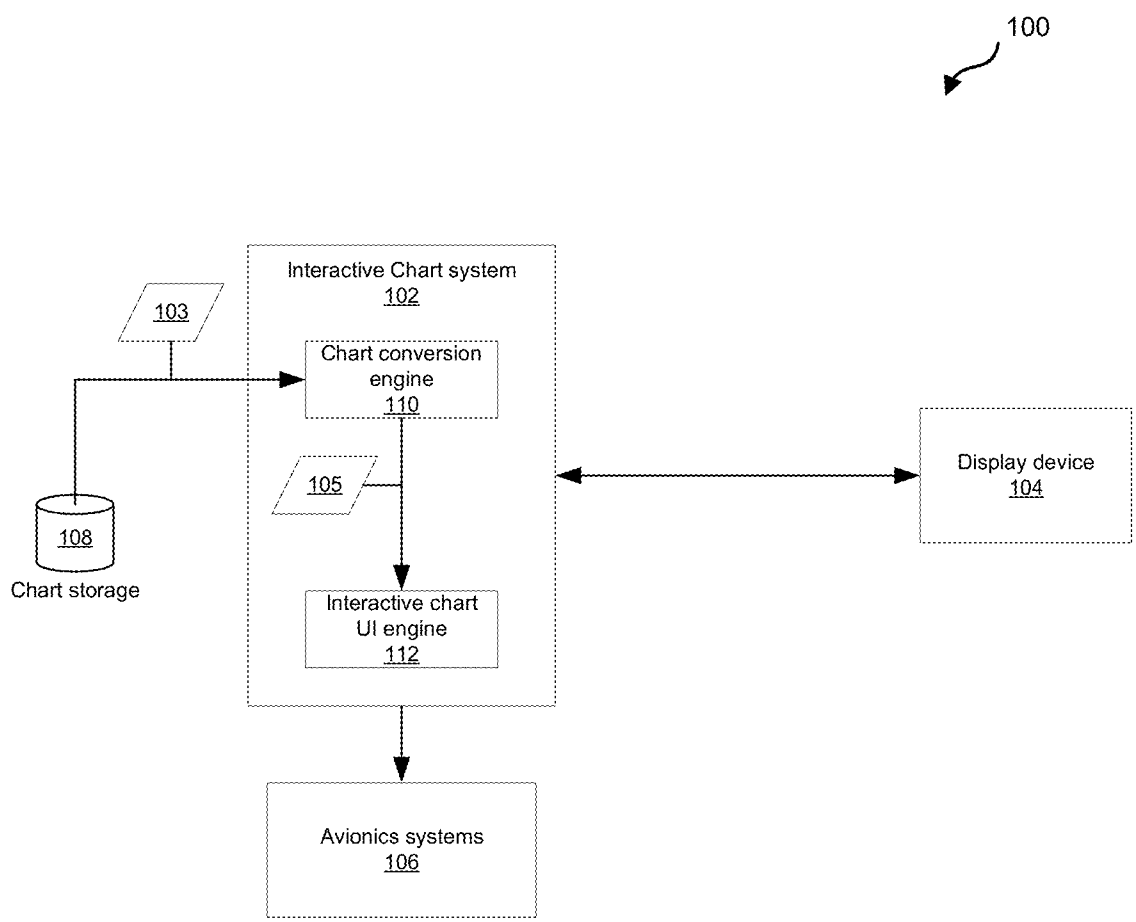
FIG. 1 is a block diagram depicting example systems for implementing an interactive chart system in an aerial vehicle, in accordance with some embodiments.

FIG. 1 is a block diagram depicting example systems 100 for implementing an interactive chart system 102 in an aerial vehicle (e.g., airplane, UAV, drone, helicopter, or other aerial vehicle). The example systems 100 include the interactive chart system 102, a display device 104 (e.g., a head down display (HDD), a head up display (HUD), a primary flight display (PFD), a multifunction display (MFD), a navigation display, an electronic flight bag (EFB), a tablet computer, or other types of display devices used in an aerial vehicle cockpit or control center for the aerial vehicle), and one or more avionics systems 106 (e.g., Communication and navigation radio receiver-transmitters, Automatic Flight Control System, Flight Management System, Aircraft monitor and warning system. Ground proximity warning system, Electronic displays system, etc.). Although the interactive chart system 102 and the display device 104 are depicted as separate entities in this example, in other examples the interactive chart system 102 may be implemented by a display device 104. The example interactive chart system 102 is configured to retrieve one or more electronic charts 103 (e.g., from chart storage 108 in computer readable media onboard the aircraft or from a cloud-based server (not shown)), convert the retrieved electronic chart(s) 103 into an interactive chart(s) 105 having selectable graphical elements that when selected can cause information content in the electronic charts to be sent to appropriate avionics systems 106 in the aircraft, and cause the interactive chart(s) 105 to be displayed on an aircraft display device 104.

The example interactive chart system 102 includes a chart conversion engine 110 and an interactive chart UI engine 112. The example chart conversion engine 110 is configured to receive or retrieve an electronic chart file for an electronic chart (e.g., arrival, approach, departure chart) in a format (e.g., pdf or other file format) that presents the electronic chart, including text formatting and images, in a manner that is not specific to application software, hardware, and operating systems. The example chart conversion engine 110 is configured to identify a plurality of data elements in the electronic chart that contain information content for flight crew entry into avionics systems on the aerial vehicle. The example chart conversion engine 110 is further configured to translate each identified data element into a control element having one or more values or flight plan data (e.g., flight planning and/or navigation data) that an avionics system will understand, wherein each control element includes a graphical user interface element that identifies the control element as including avionics information comprising one or more values, flight planning data or navigational data that may be entered into an avionics system. The example chart conversion engine 110 is also configured to add the control elements to the other elements of the electronic chart to generate an interactive chart.

The example interactive chart UI engine 112 is configured to associate each control element with one or more avionics systems into which the avionics information of the control element may be entered and cause the electronic chart with the control elements to be displayed on the display device 104. Responsive to user selection (e.g., via cursor selection or touchscreen selection) of a control element, the example interactive chart UI engine 112 is configured to cause a data entry graphical element (e.g., a dialog box overlayed on top of the electronic chart, a dialog box next to the electronic chart or on another screen, a pop-up box, a separate window, etc.) to be displayed on the display device 104. The displayed data entry graphical element includes avionics information from the selected control element and one or more selectable graphical elements (e.g., button) identifying an avionics system function for the avionics information. The example interactive chart UI engine 112 is further configured to cause the avionics information from the selected control element to be transferred to the avionics system 106 associated with the control element responsive to the selection of a displayed selectable graphical element to change the state of an avionics system 106 associated with the control element.

The example interactive chart UI engine 112 is also configured to associate avionics information from the electronic chart in the form of flight planning or navigation data with navigation database data and provide one or more selectable graphical elements (e.g., button) for modifying an intended aerial vehicle flight path with the flight planning or navigation data. Responsive to the selection of a displayed selectable graphical element for modifying an intended aerial vehicle flight path with the flight planning or navigation data, the example interactive chart UI engine 112 is configured to cause the intended aerial vehicle flight path to be modified with the flight planning or navigation data from the electronic chart.

The example interactive chart system 102, including the chart conversion engine 110 and the interactive chart UI engine 112, are implemented by a controller. The controller includes at least one processor and a non-transitory computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The non-transitory computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

Figure 2:
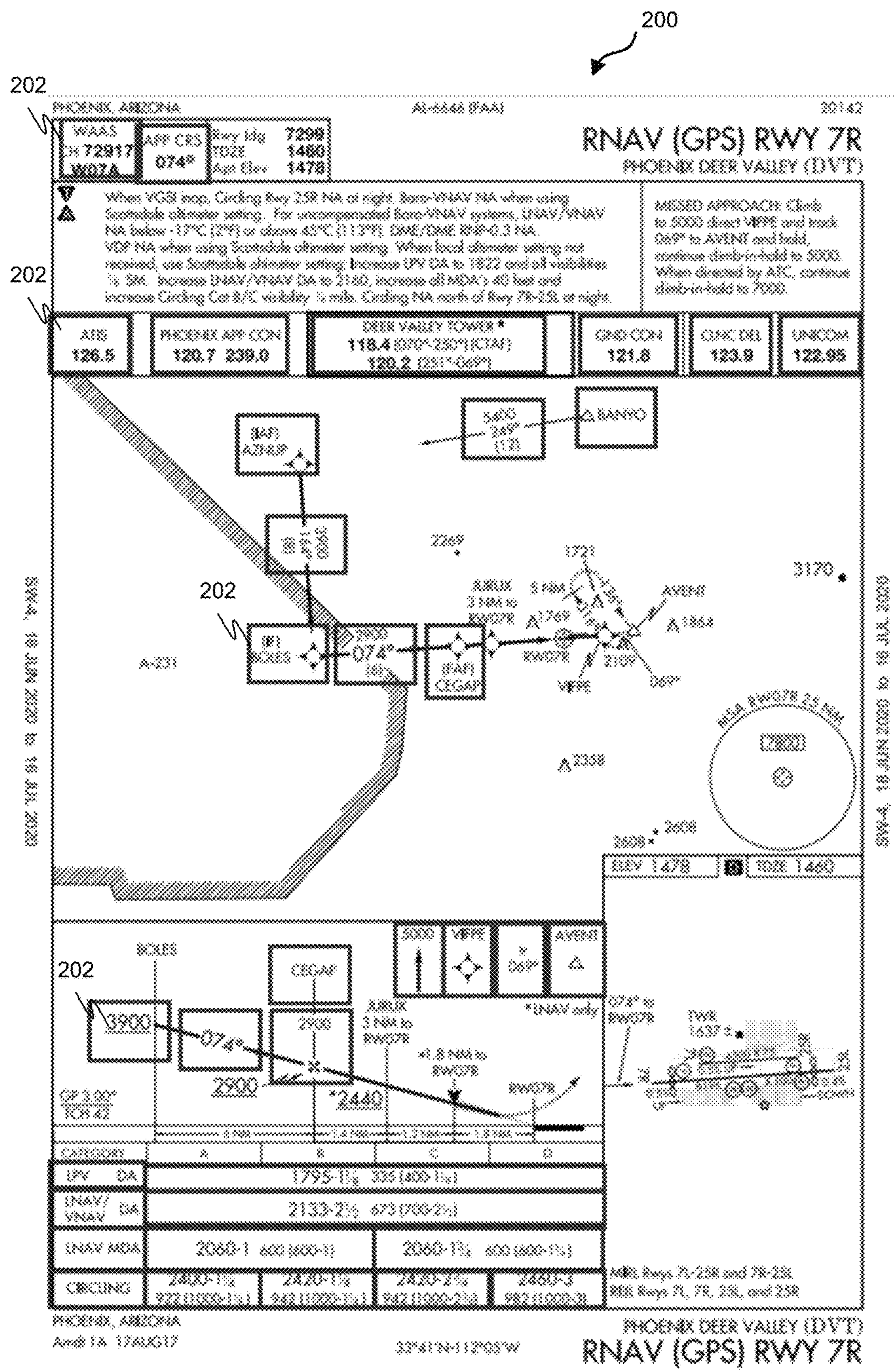
FIG. 2 is a diagram illustrating an example approach chart with highlighted data elements that may be made interactive to allow for automatic entry to appropriate avionics equipment upon user selection of an appropriate graphical element, in accordance with some embodiments.

FIG. 2 is a diagram illustrating an example approach chart 200 with highlighted data elements 202 (e.g., highlighted with boxes that encompass the data elements) that may be made interactive to allow for automatic entry to appropriate avionics equipment upon user selection of an appropriate graphical element. For ease of readability, reference label "202" has not been applied to each highlighted data element in FIG. 2, but each data item that is encompassed in a box is considered to be a highlighted data element 202 for the purpose of this example. The example chart conversion engine 110 is configured to identify the data elements in the electronic chart 200 that contain information content for flight crew entry into avionics systems on the aerial vehicle. The example chart conversion engine 110 is further configured to translate each identified data element into a control element having one or more values or flight plan data that an avionics system will understand, wherein each control element includes a graphical user interface element that identifies the control element as including avionics information comprising one or more values, flight planning data or navigational data that may be entered into an avionics system. The example chart conversion engine 110 is also configured to add the control elements to the other elements of the electronic chart to generate an interactive chart.

Figure 3C:
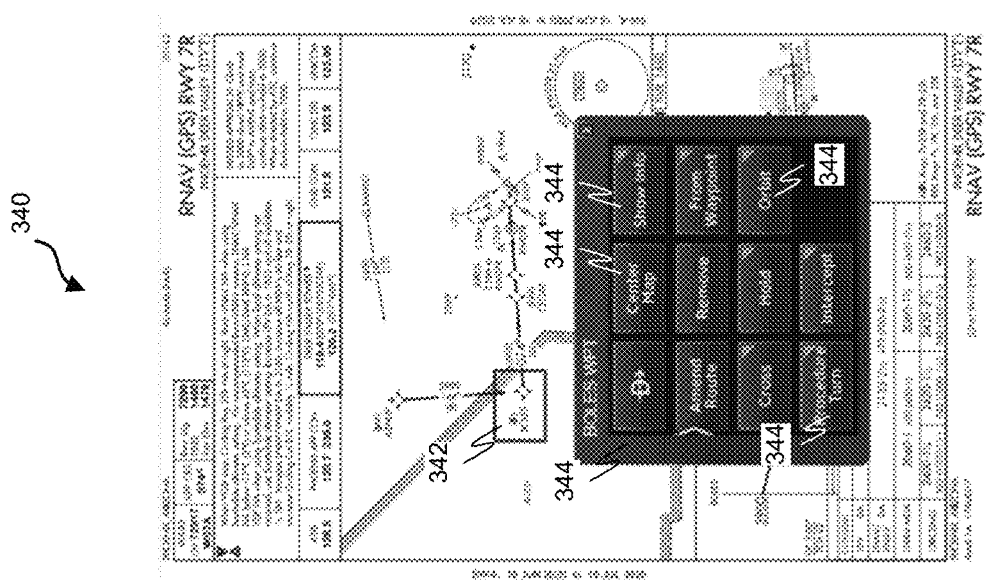
FIGS. 3A, 3B, and 3C are diagrams that each illustrate an example use of an interactive approach chart, in accordance with some embodiments.
Figure 3B:
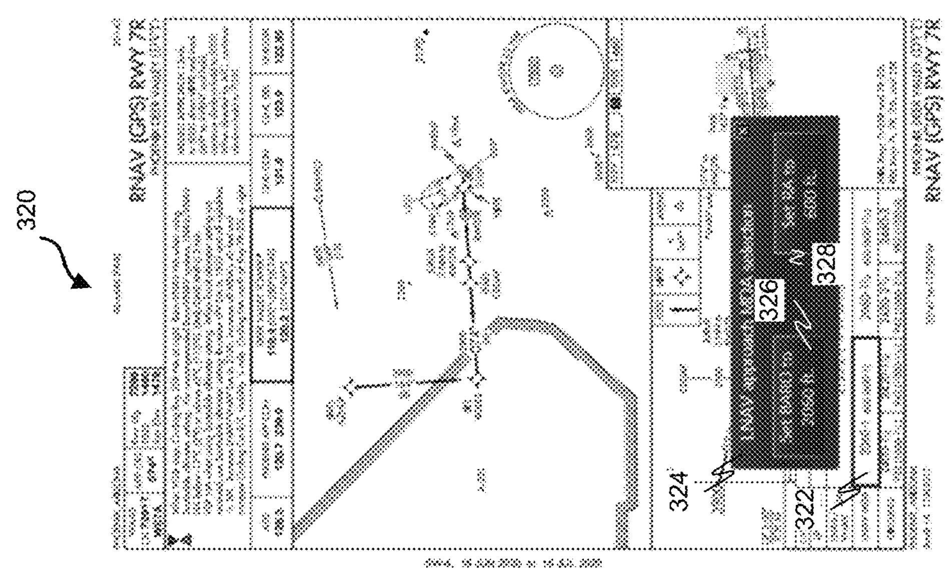
Figure 3A:
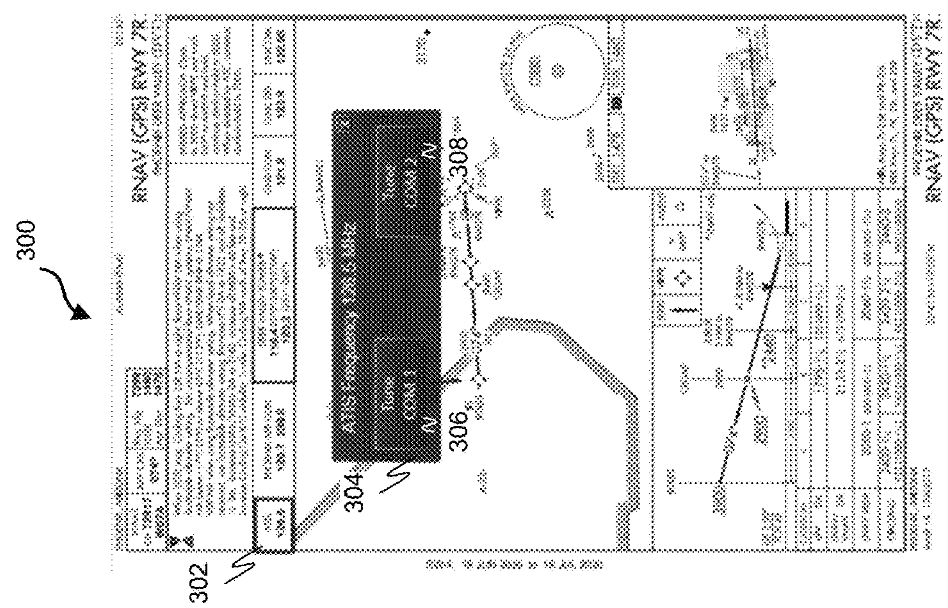

In one example operating scenario, a flight crew member can be presented with an electronic chart for arrival, approach or departure on a cockpit touchscreen display device. While viewing the chart to determine next actions, the flight crew member can touch one of many control elements of interest and the interactive chart system 102 would automatically cause a data entry graphical element (e.g., a dialog box overlayed on top of the electronic chart, a dialog box next to the electronic chart or on another screen, a pop-up box, a separate window, etc.) containing one or more selectable graphical elements (e.g., button) to be displayed on the display device that will allow the flight crew member to command changes to the state of an avionics system associated with the selected control element. The type of state changes that may be commanded include: Communication radio control—COM frequency change; Flight Guidance Target control—altitude, speed, course, heading changes; Lateral and vertical control—lateral and vertical direct to waypoints on the chart; Approach control—loading selected approach into flight management system; Minimums control—setting minimums value to avionics alerting system. Selection of a selectable graphical element (e.g., button) on the data entry graphical element will result in the interactive chart system 102 providing avionics information from the interactive chart to an avionics system to command changes to the state of the avionics system associated with the selected control element FIGS. 3A, 3B, and 3C are diagrams that each illustrate an example use of an interactive approach chart. In FIG. 3A, an interactive data element 302 has been selected on the interactive approach chart 300. The example interactive data element 302 includes information identifying the ATIS frequency at the Phoenix Deer Valley airport. Upon selection of the ATIS interactive data element 302, a data entry graphical element (e.g., dialog box 304) is generated and overlayed on top of the display of the interactive approach chart 300. The example dialog box 304 includes two selectable graphical elements (e.g., buttons 306, 308), each for selection of one of two COM radios, wherein selection of one of the buttons results in the ATIS frequency provided on the interactive approach chart being sent to the COM radio associated with the selected button for tuning the selected COM radio to the ATIS frequency.

In FIG. 3B, an interactive data element 322 has been selected on the interactive approach chart 320. The example interactive data element 322 includes information for LNAV approach MDA selection at the Phoenix Deer Valley airport. Upon selection of the interactive data element 322, a data entry graphical element (e.g., dialog box 324) is generated and overlayed on top of the display of the interactive approach chart 320. The example dialog box 324 includes two selectable graphical elements (e.g., buttons 326, 328), one for setting the MDA (minimum descent altitude) to either 2060 ft of barometric altitude or to 600 ft of radio altitude (altitude above terrain). Selection of one of the buttons results in data from the interactive approach chart being sent to avionics system associated with the selected button.

In FIG. 3C, an interactive data element 342 has been selected on the interactive approach chart 340. The example interactive data element 342 includes avionics information in the form of flight planning or navigation data (e.g., information regarding a Boles waypoint) that is associated with navigation database data. Upon selection of the data element 342, a data entry graphical element (e.g., dialog box 344) is generated and overlayed on top of the display of the interactive approach chart 340. The example dialog box 344 includes eleven selectable buttons 346 (for ease of readability only four of the eleven are labelled, but it is apparent that the other unlabeled buttons are included in the eleven selectable buttons 346). Each of the selectable buttons 346 identifies an avionics system function for the avionics information. Selection of one of the buttons 346 results in the display of a menu for modifying the aircraft's path in respect to a particular waypoint related to the selected button.

This functionality (e.g., via interactive data items, data entry graphical elements, and selectable graphical elements) can improve aircraft operations. For example, allowing a flight crew member to enter data from charts in the foregoing described manner can reduce or minimize flight crew member entry error. By providing automatic linkage of data from source (chart) to the end system (avionics component) flight crew member entry error or mistyping may be eliminated. This functionality can result in increased speed during cockpit operations. A flight crew member can enter data from charts without having to navigate through different menus to find what they are looking for. This functionality can enable the flight crew to significantly reduce heads down time, because a flight crew member may not need to manually retrieve data from the charts and manually enter the data from the charts into an appropriate avionics system. This functionality may simplify operations and potentially minimize pilot training requirements. A flight crew member may not need to be entirely familiar with each avionics system to perform basic tasks. A flight crew member can enter data from charts into appropriate avionics system by retrieving the interactive charts and using touch gestures to enter the data into appropriate avionics systems. This functionality can reduce the human error aspect of choosing the right data for an avionics system because the system can automatically fetch data from the electronic charts and send the data to the appropriate avionics system. This functionality can enable the flight crew to quickly act during busy times during a mission and can enhance the safety of flight operation during critical phases of flight.

Figure 4:
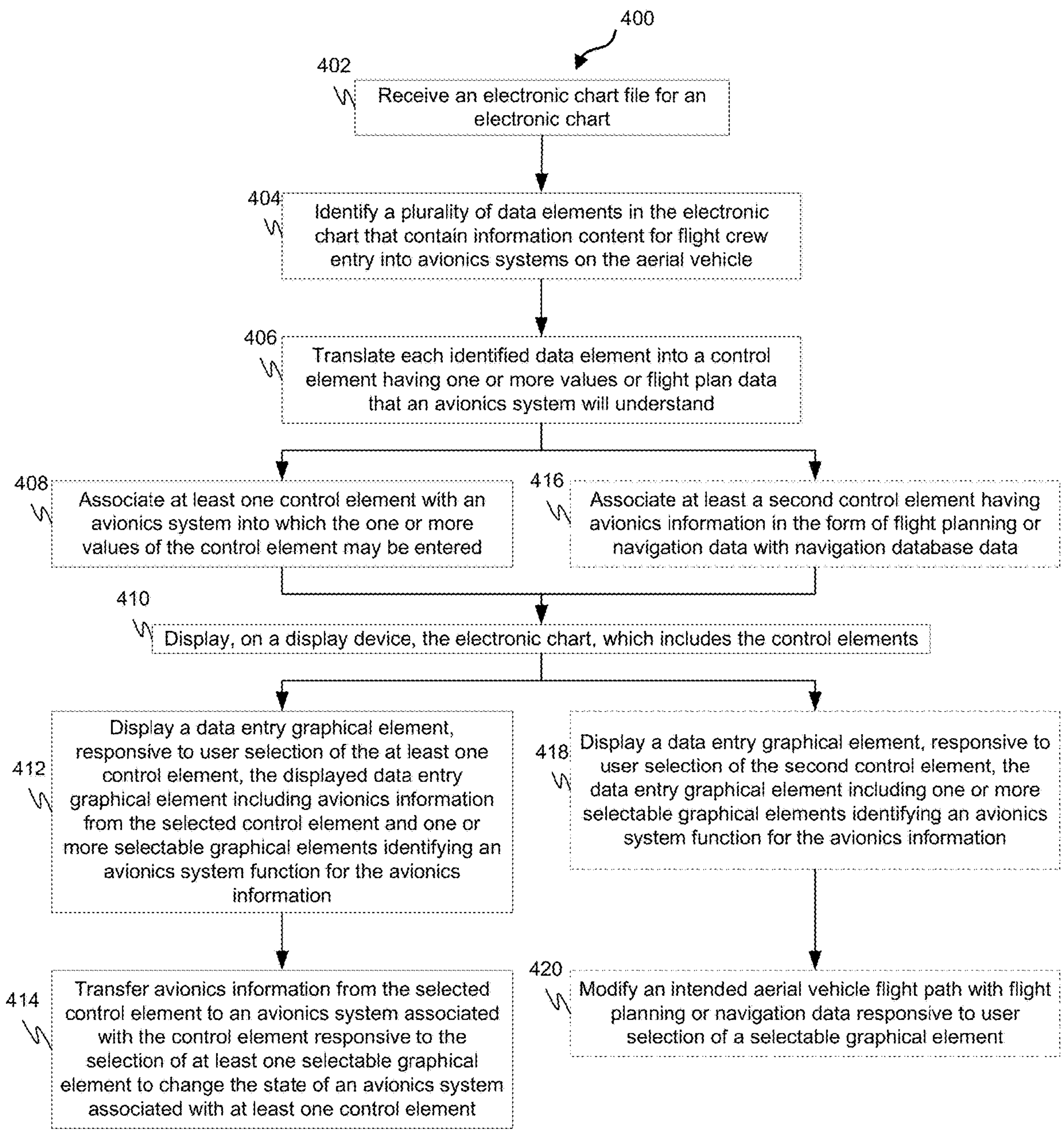
FIG. 4 is a process flow chart depicting an example process in an aerial vehicle for transferring electronic chart data during aerial vehicle operations to an avionics system, in accordance with some embodiments.

FIG. 4 is a process flow chart depicting an example process 400 in an aerial vehicle for transferring electronic chart data during aerial vehicle operations to an avionics system. The order of operation within the process is not limited to the sequential execution as illustrated in the figure, but may be performed in one or more varying orders as applicable and in accordance with the present disclosure.

The example process 400 includes receiving an electronic chart file for an electronic chart (operation 402). The electronic chart may be in a format (e.g., pdf (portable data format)) that presents the electronic chart, including text formatting and images, in a manner that is not specific to application software, hardware, and operating systems. The electronic chart may comprise an arrival chart, an approach chart, a departure chart, or some other type of chart used by flight crew for flight planning or navigation.

The example process 400 includes identifying a plurality of data elements in the electronic chart that contain information content for flight crew entry into avionics systems on the aerial vehicle (operation 404).

The example process 400 includes translating each identified data element into a control element having one or more values or flight plan data (e.g., flight planning and/or navigation data) that an avionics system will understand (operation 406). Each control element may include a graphical user interface element that identifies the control element as including avionics information comprising one or more values, flight planning data or navigational data that may be entered into an avionics system. The graphical user interface element that identifies the control element may comprise a surrounding box.

The example process 400 includes associating at least one control element with an avionics system into which the one or more values of the control element may be entered (operation 408). The identifying, translating, and associating may be performed in advance of the receiving an electronic chart file and the process 400 may further comprise storing the control elements in the electronic file. The identifying, translating, and associating may be performed after the receiving an electronic chart.

The example process 400 also includes displaying, on a display device, the electronic chart which includes the control elements (operation 410). The control elements may or may not be highlighted or annotated to visually distinguish the data elements in the electronic chart that contain information content for flight crew entry into avionics systems from the data elements in the electronic chart that do not contain information content for flight crew entry into avionics systems.

The example process 400 includes displaying a data entry graphical element, responsive to user selection of the at least one control element, wherein the displayed data entry graphical element includes avionics information from the selected control element and one or more selectable graphical elements identifying an avionics system function for the avionics information (operation 412). The displaying a data entry graphical element may comprise displaying one or more of a dialog box overlayed on top of the electronic chart, a dialog box next to the electronic chart or on another screen, a pop-up box, or a separate window. The avionics system function may comprise one or more of: communication radio control, flight guidance target control, lateral and vertical control, approach control, minimums control, or other avionics system functions.

The example process 400 includes transferring avionics information from the selected control element to an avionics system associated with the control element responsive to the selection of at least one selectable graphical element to change the state of an avionics system associated with at least one control element (operation 414).

The example process 400 may optionally include associating at least a second control element having avionics information in the form of flight planning or navigation data with navigation database data (operation 416).

The example process 400 may optionally include displaying a data entry graphical element responsive to user selection of the second control element, wherein the data entry graphical element includes one or more selectable graphical elements identifying an avionics system function for the avionics information (operation 418).

The example process 400 may optionally include modifying an intended aerial vehicle flight path with the flight planning or navigation data responsive to user selection of a selectable graphical element (operation 420). Operations 416, 418, and 420 may be performed in parallel with, sequentially with, or in the alternative to operations 408, 412, and 414.

Described herein are apparatus, systems, techniques, and articles for providing automation between electronic charts and data entry into avionics system which can provide further automation in the cockpit, ease pilot workload, minimize human error during manual data re-entry and provide a very intuitive interface to setup avionics while cross-checking electronic charts.

In one embodiment, a processor-implemented method in an aerial vehicle for transferring electronic chart data during aerial vehicle operations to an avionics system is provided. The method comprises: receiving an electronic chart file for an electronic chart; identifying a plurality of data elements in the electronic chart that contain information content for flight crew entry into avionics systems on the aerial vehicle; translating each identified data element into a control element having one or more values or flight plan data (e.g., flight planning and/or navigation data) that an avionics system will understand; associating at least one control element with an avionics system into which the one or more values or flight plan data of the control element may be entered whereby the electronic chart is converted to an interactive electronic chart; displaying, on a display device, the interactive electronic chart which includes the control elements (the control elements may or may not be highlighted or annotated to visually distinguish the data elements in the electronic chart that contain information content for flight crew entry into avionics systems from the data elements in the electronic chart that do not contain information content for flight crew entry into avionics systems); displaying a data entry graphical element, responsive to user selection of the at least one control element, the displayed data entry graphical element including avionics information from the selected control element and one or more selectable graphical elements identifying an avionics system function for the avionics information; and transferring avionics information from the selected control element to an avionics system associated with the control element responsive to the selection of at least one selectable graphical element to change a state of an avionics system associated with at least one control element; wherein the plurality of data elements in the interactive electronic chart that contain information content for flight crew entry into avionics systems on the aerial vehicle are made interactive.

These aspects and other embodiments may include one or more of the following features. The method may further comprise modifying an intended aerial vehicle flight path with flight planning or navigation data responsive to user selection of a selectable graphical element. The electronic chart may comprise an arrival chart, an approach chart, a departure chart, or some other type of chart used for flight planning or navigation. The electronic chart file may be received in a format that presents the electronic chart, including text formatting and images, in a manner that is not specific to application software, hardware, and operating systems. The format that presents the electronic chart, including text formatting and images, in a manner that is not specific to application software, hardware, and operating systems may comprise a pdf (portable data format) or some other type of format. Each control element may include a graphical user interface element that identifies the control element as including avionics information comprising one or more values, flight planning data or navigational data that may be entered into an avionics system. The graphical user interface element that identifies the control element may comprise a surrounding box. The displaying a data entry graphical element may comprise displaying one or more of a dialog box overlayed on top of the interactive electronic chart, a dialog box next to the interactive electronic chart or on another screen, a pop-up box, or a separate window. The identifying, translating, and associating may be performed in advance of the receiving an electronic chart file and the method further may comprise storing the control elements in the electronic file. The identifying, translating, and associating may be performed after the receiving an electronic chart file. The avionics system function may comprise one or more of: communication radio control, flight guidance target control, lateral and vertical control, approach control, minimums control, or some other avionics system function.

In another embodiment, a system in an aerial vehicle for transferring electronic chart data during aerial vehicle operations to an avionics system is provided. The system comprises a controller configured to: receive an electronic chart file for an electronic chart; identify a plurality of data elements in the electronic chart that contain information content for flight crew entry into avionics systems on the aerial vehicle; translate each identified data element into a control element having one or more values or flight plan data (e.g., flight planning and/or navigation data) that an avionics system will understand; associate at least one control element with an avionics system into which the one or more values or flight plan data of the control element may be entered whereby the electronic chart is converted to an interactive electronic chart; cause the interactive electronic chart which includes the control elements to be displayed on a display device (the control elements may or may not be highlighted or annotated to visually distinguish the data elements in the electronic chart that contain information content for flight crew entry into avionics systems from the data elements in the electronic chart that do not contain information content for flight crew entry into avionics systems); cause a data entry graphical element to be displayed, responsive to user selection of the at least one control element, wherein the displayed data entry graphical element includes avionics information from the selected control element and one or more selectable graphical elements identifying an avionics system function for the avionics information; and transferring avionics information from the selected control element to an avionics system associated with the control element responsive to the selection of at least one selectable graphical element to change a state of an avionics system associated with at least one control element; wherein the plurality of data elements in the interactive electronic chart that contain information content for flight crew entry into avionics systems on the aerial vehicle are made interactive.

These aspects and other embodiments may include one or more of the following features. The controller may be further configured to cause an intended aerial vehicle flight path to be modified with flight planning or navigation data responsive to user selection of a selectable graphical element. The electronic chart may comprise an arrival chart, an approach chart, a departure chart, or some other type of chart used for flight planning or navigation. The electronic chart file may be received in a format that presents the electronic chart, including text formatting and images, in a manner that is not specific to application software, hardware, and operating systems. The format that presents the electronic chart, including text formatting and images, in a manner that is not specific to application software, hardware, and operating systems may comprise a pdf (portable data format) or some other type of format. Each control element may include a graphical user interface element that identifies the control element as including avionics information comprising one or more values, flight planning data or navigational data that may be entered into an avionics system. The graphical user interface element that identifies the control element may comprise a surrounding box. The controller may be configured to display a data entry graphical element by displaying one or more of a dialog box overlayed on top of the interactive electronic chart, a dialog box next to the interactive electronic chart or on another screen, a pop-up box, or a separate window. The avionics system function may comprise one or more of: communication radio control, flight guidance target control, lateral and vertical control, approach control, minimums control, or some other avionics system function.

In another embodiment, non-transitory computer readable media encoded with programming instructions configurable to cause a processor in an aerial vehicle to perform a method is provided. The method comprises: receiving an electronic chart file for an electronic chart; identifying a plurality of data elements in the electronic chart that contain information content for flight crew entry into avionics systems on the aerial vehicle; translating each identified data element into a control element having one or more values or flight plan data (e.g., flight planning and/or navigation data) that an avionics system will understand; associating at least one control element with an avionics system into which the one or more values or flight plan data of the control element may be entered whereby the electronic chart is converted to an interactive electronic chart; causing the interactive electronic chart which includes the control elements to be displayed on a display device (the control elements may or may not be highlighted or annotated to visually distinguish the data elements in the electronic chart that contain information content for flight crew entry into avionics systems from the data elements in the electronic chart that do not contain information content for flight crew entry into avionics systems); causing a data entry graphical element to be displayed responsive to user selection of the at least one control element, wherein the displayed data entry graphical element includes avionics information from the selected control element and one or more selectable graphical elements identifying an avionics system function for the avionics information; and transferring avionics information from the selected control element to an avionics system associated with the control element responsive to the selection of at least one selectable graphical element to change a state of an avionics system associated with at least one control element; wherein the plurality of data elements in the interactive electronic chart that contain information content for flight crew entry into avionics systems on the aerial vehicle are made interactive.

These aspects and other embodiments may include one or more of the following features. The method may further comprise modifying an intended aerial vehicle flight path with flight planning or navigation data responsive to user selection of a selectable graphical element. The electronic chart may comprise an arrival chart, an approach chart, or a departure chart, or some other type of chart used for flight planning or navigation. The electronic chart file may be received in a format that presents the electronic chart, including text formatting and images, in a manner that is not specific to application software, hardware, and operating systems. The format that presents the electronic chart, including text formatting and images, in a manner that is not specific to application software, hardware, and operating systems may comprise a pdf (portable data format). Each control element may include a graphical user interface element that identifies the control element as including avionics information comprising one or more values, flight planning data or navigational data that may be entered into an avionics system. The graphical user interface element that identifies the control element may comprise a surrounding box. The displaying a data entry graphical element may comprise displaying one or more of a dialog box overlayed on top of the interactive electronic chart, a dialog box next to the interactive electronic chart or on another screen, a pop-up box, or a separate window. The identifying, translating, and associating may be performed in advance of the receiving an electronic chart file and the method further may comprise storing the control elements in the electronic file. The identifying, translating, and associating may be performed after the receiving an electronic chart file. The avionics system function may comprise one or more of: communication radio control, flight guidance target control, lateral and vertical control, approach control, minimums control, or some other avionics system function.

In another embodiment, a processor-implemented method for providing an interactive electronic chart in an aerial vehicle is provided. The method comprises: receiving an electronic chart file for an electronic chart (e.g., arrival, approach, departure chart) in a format (e.g., pdf or other file format) that presents the electronic chart, including text formatting and images, in a manner that is not specific to application software, hardware, and operating systems; identifying a plurality of data elements in the electronic chart that contain information content for flight crew entry into avionics systems on the aerial vehicle; translating each identified data element into a control element having one or more values or flight plan data (e.g., flight planning and/or navigation data) that an avionics system will understand, each control element including a graphical user interface element that identifies the control element (e.g., by a surrounding box) as including avionics information comprising one or more values, flight planning data or navigational data that may be entered into an avionics system; associating each control element with an avionics system (e.g., one or more) into which the avionics information of the control element may be entered; displaying, on a cockpit display, the electronic chart with the control elements; displaying a data entry graphical element (e.g., a dialog box overlayed on top of the electronic chart, a dialog box next to the electronic chart or on another screen, a pop-up box, a separate window, etc.), responsive to user selection (e.g., via cursor selection or touchscreen selection) of a control element, the displayed data entry graphical element including avionics information from the selected control element and one or more selectable graphical elements (e.g., button) identifying an avionics system function for the avionics information; transferring avionics information from the selected control element to an avionics system associated with the control element responsive to the selection of a displayed selectable graphical element to change a state of an avionics system associated with the control element; associating avionics information in the form of flight planning or navigation data with navigation database data; providing a graphical interactive user interface for modifying an intended aerial vehicle flight path with the flight planning or navigation data; and modifying an intended aerial vehicle flight path with the flight planning or navigation data using the graphical interactive user interface responsive to user selection.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method in an aerial vehicle for transferring electronic chart data during aerial vehicle operations to an avionics system, the method comprising:

receiving a file in a file format that presents an electronic chart, including text formatting and images, in a manner that is not specific to application software, hardware, and operating systems;

identifying from the file in the file format that presents the electronic chart in a manner that is not specific to application software, hardware, and operating systems a data element that contains information content for flight crew entry into avionics systems on the aerial vehicle;

translating the identified data element identified from the file in the file format that presents the electronic chart in a manner that is not specific to application software, hardware, and operating systems into a user-selectable control element having one or more values or flight plan data and having a graphical user interface element that identifies the user-selectable control element as including avionics information that may be entered into an avionics system;

associating the user-selectable control element that was derived from the file in the file format that presents the electronic chart in a manner that is not specific to application software, hardware, and operating systems with an avionics system into which the one or more values or flight plan data of the user-selectable control element may be entered;

converting the file in the file format that presents the electronic chart in a manner that is not specific to application software, hardware, and operating systems to an interactive electronic chart by the associating the user-selectable control element with the avionics system into which the one or more values or flight plan data of the user-selectable control element may be entered;

displaying, on a display device, the interactive electronic chart that was derived from the file in the file format that presents the electronic chart in a manner that is not specific to application software, hardware, and operating systems and includes the user-selectable control element;

displaying, responsive to user selection of the user-selectable control element, a data entry graphical element that includes avionics information from the selected user-selectable control element and one or more selectable graphical elements identifying an avionics system function for the avionics information; and transferring, responsive to user-selection of at least one selectable graphical element, avionics information from the selected user-selectable control element to an avionics system associated with the user-selectable control element to change a state of an avionics system associated with at least one user-selectable control element;

wherein the data element in the interactive electronic chart that contains information content for flight crew entry into an avionics system on the aerial vehicle is made interactive.

2. The method of claim 1, further comprising modifying an intended aerial vehicle flight path with flight planning or navigation data responsive to user selection of a selectable graphical element.

3. The method of claim 1, wherein the electronic chart comprises an arrival chart, an approach chart, or a departure chart.

4. The method of claim 1, wherein the format that presents the electronic chart, including text formatting and images, in a manner that is not specific to application software, hardware, and operating systems comprises a pdf (portable data format).

5. The method of claim 1, wherein the user-selectable control element includes a graphical user interface element that identifies the user-selectable control element as including avionics information comprising one or more values, flight planning data or navigational data that may be entered into an avionics system.

6. The method of claim 5, wherein the graphical user interface element that identifies the user-selectable control element comprises a surrounding box.

7. The method of claim 1, wherein the displaying a data entry graphical element comprises displaying one or more of a dialog box overlayed on top of the interactive electronic chart, a dialog box next to the interactive electronic chart or on another screen, a pop-up box, or a separate window.

8. The method of claim 1, further comprising storing the user-selectable control element in the electronic chart file for retrieval during aerial vehicle operations.

9. The method of claim 1, wherein the identifying, translating, and associating are performed after the receiving a file in a file format that presents an electronic chart, including text formatting and images, in a manner that is not specific to application software, hardware, and operating systems.

10. The method of claim 1, wherein the avionics system function comprises one or more of: communication radio control, flight guidance target control, lateral and vertical control, approach control, or minimums control.

11. A system in an aerial vehicle for transferring electronic chart data during aerial vehicle operations to an avionics system, the system comprising a controller configured to:

receive a file in a file format that presents an electronic chart, including text formatting and images, in a manner that is not specific to application software, hardware, and operating systems;

identify from the file in the file format that presents the electronic chart in a manner that is not specific to application software, hardware, and operating systems a data element that contains information content for flight crew entry into avionics systems on the aerial vehicle;

translate the identified data element identified from the file in the file format that presents the electronic chart in a manner that is not specific to application software, hardware, and operating systems into a user-selectable control element having one or more values or flight plan data and having a graphical user interface element that identifies the user-selectable control element as including avionics information that may be entered into an avionics system;

associate the user-selectable control element that was derived from the file in the file format that presents the electronic chart in a manner that is not specific to application software, hardware, and operating systems with an avionics system into which the one or more values or flight plan data of the user-selectable control element may be entered;

convert the file in the file format that presents the electronic chart in a manner that is not specific to application software, hardware, and operating systems to an interactive electronic chart by the associating the user-selectable control element with the avionics system into which the one or more values or flight plan data of the user-selectable control element may be entered;

cause the interactive electronic chart that was derived from the file in the file format that presents the electronic chart in a manner that is not specific to application software, hardware, and operating systems and includes the user-selectable control elements to be displayed on a display device;

cause to be displayed, responsive to user selection of the user-selectable control element, a data entry graphical element that includes avionics information from the selected user-selectable control element and one or more selectable graphical elements identifying an avionics system function for the avionics information; and transferring, responsive to user-selection of at least one selectable graphical element, avionics information from the selected user-selectable control element to an avionics system associated with the user-selectable control element to change a state of an avionics system associated with at least one user-selectable control element;

wherein the data element in the interactive electronic chart that contain information content for flight crew entry into an avionics system on the aerial vehicle is made interactive.

12. The system of claim 11, wherein the controller is further configured to cause an intended aerial vehicle flight path to be modified with flight planning or navigation data responsive to user selection of a selectable second graphical element.

13. The system of claim 11, wherein the electronic chart comprises an arrival chart, an approach chart, or a departure chart.

14. The system of claim 11, wherein the user-selectable control element includes a graphical user interface element that identifies the user-selectable control element as including avionics information comprising one or more values, flight planning data or navigational data that may be entered into an avionics system.

15. The system of claim 11, wherein the controller is configured to display a data entry graphical element by displaying one or more of a dialog box overlayed on top of the interactive electronic chart, a dialog box next to the interactive electronic chart or on another screen, a pop-up box, or a separate window.

16. The system of claim 11, wherein the avionics system function comprises one or more of: communication radio control, flight guidance target control, lateral and vertical control, approach control, or minimums control.

17. Non-transitory computer readable media encoded with programming instructions configurable to cause a processor in an aerial vehicle to perform a method, the method comprising:

receiving a file in a file format that presents an electronic chart, including text formatting and images, in a manner that is not specific to application software, hardware, and operating systems;

identifying from the file in the file format that presents the electronic chart in a manner that is not specific to application software, hardware, and operating systems a data element that contains information content for flight crew entry into avionics systems on the aerial vehicle;

translating the identified data element identified from the file in the file format that presents the electronic chart in a manner that is not specific to application software, hardware, and operating systems into a user-selectable control element having one or more values or flight plan data and having a graphical user interface element that identifies the user-selectable control element as including avionics information that may be entered into an avionics system;

associating the user-selectable control element that was derived from the file in the file format that presents the electronic chart in a manner that is not specific to application software, hardware, and operating systems with an avionics system into which the one or more values or flight plan data of the user-selectable control element may be entered;

converting the file in the file format that presents the electronic chart in a manner that is not specific to application software, hardware, and operating systems to an interactive electronic chart by the associating the user-selectable control element with the avionics system into which the one or more values or flight plan data of the user-selectable control element may be entered;

causing the interactive electronic chart that was derived from the file in the file format that presents the electronic chart in a manner that is not specific to application software, hardware, and operating systems and includes the user-selectable control elements to be displayed on a display device;

causing to be displayed, responsive to user selection of the user-selectable control element, a data entry graphical element that includes avionics information from the selected user-selectable control element and one or more selectable graphical elements identifying an avionics system function for the avionics information; and transferring, responsive to user-selection of at least one selectable graphical element, avionics information from the selected user-selectable control element to an avionics system associated with the user-selectable control element to change a state of an avionics system associated with at least one user-selectable control element;

wherein the data element in the interactive electronic chart that contains information content for flight crew entry into an avionics system on the aerial vehicle is made interactive.

18. The non-transitory computer readable media of claim 17, wherein the method further comprises modifying an intended aerial vehicle flight path with flight planning or navigation data responsive to user selection of a selectable second graphical element.

* * * * *